US009556035B2

(12) United States Patent
Ichitsubo et al.

(10) Patent No.: US 9,556,035 B2
(45) Date of Patent: Jan. 31, 2017

(54) PARTICLES FORMED OF SILICA AND CARBON, AND METHOD FOR PRODUCING MIXTURE OF SILICA AND CARBON

(75) Inventors: Kouki Ichitsubo, Chiba (JP); Kenta Masuda, Chiba (JP); Masakazu Suzuki, Chiba (JP); Kohei Kawano, Chiba (JP); Jun Kumasaka, Chiba (JP)

(73) Assignee: TAIHEIYO CEMENT CORPORATION, Tokyo (JP)

( * ) Notice: Subject to any disclaimer, the term of this patent is extended or adjusted under 35 U.S.C. 154(b) by 325 days.

(21) Appl. No.: 14/129,576

(22) PCT Filed: Jul. 3, 2012

(86) PCT No.: PCT/JP2012/066990
§ 371 (c)(1),
(2), (4) Date: Apr. 25, 2014

(87) PCT Pub. No.: WO2013/005741
PCT Pub. Date: Jan. 10, 2013

(65) Prior Publication Data
US 2014/0227159 A1    Aug. 14, 2014

(30) Foreign Application Priority Data

Jul. 4, 2011 (JP) .................................. 2011-148509
Nov. 1, 2011 (JP) .................................. 2011-240103

(51) Int. Cl.
*C01B 31/36*    (2006.01)
*C01B 33/193*    (2006.01)

(52) U.S. Cl.
CPC ............. *C01B 31/36* (2013.01); *C01B 33/193* (2013.01); *C01P 2002/72* (2013.01);
(Continued)

(58) Field of Classification Search
None
See application file for complete search history.

(56) References Cited

U.S. PATENT DOCUMENTS 3,959,445 A * 5/1976 Jayawant ................. B01J 20/10
423/332
4,112,032 A * 9/1978 Blaszyk .................... B01J 21/08
264/42

(Continued)

FOREIGN PATENT DOCUMENTS

CA    2 739 026 A1    4/2010
GB    968590    9/1964
(Continued)

OTHER PUBLICATIONS

Sun et al.; Physiochemical Characterization of Lignins from Rice Straw by Hydrogen Peroxide Treatment; Journal of Applied Polymer Science, vol. 79, No. 4, pp. 719-732; 2001.*

(Continued)

*Primary Examiner* — Guinever S Gregorio
(74) *Attorney, Agent, or Firm* — Posz Law Group, PLC (57) ABSTRACT

A particle formed of silica and carbon having a low impurity content and an excellent reactivity is provided. Also provided is a method of producing a silica and carbon-containing material including: (B) a carbon mixing step of mixing an aqueous alkali silicate solution having a silicon concentration within the liquid portion of at least 10 wt % with carbon so as to obtain a carbon-containing aqueous alkali silicate solution; and (C) a silica recovery step of mixing the carbon-containing aqueous alkali silicate solution with a mineral acid so as to cause carbon and silicon within the liquid portion to precipitate as particles formed of silica and carbon and thus obtaining a particle-containing liquid substance, then solid-liquid separating the liquid substance so as to obtain a solid portion of a silica and carbon-containing
(Continued)

material which is an assembly of particles formed of silica and carbon and a liquid portion containing impurities.

11 Claims, 6 Drawing Sheets

(52) U.S. Cl.
CPC ...... *C01P 2004/01* (2013.01); *C01P 2004/03* (2013.01); *C01P 2004/61* (2013.01); *C01P 2006/80* (2013.01)

(56) References Cited

U.S. PATENT DOCUMENTS

| | | | |
|---|---|---|---|
| 2005/0227868 A1 | 10/2005 | Hinman et al. | |
| 2006/0089258 A1 | 4/2006 | Hinman et al. | |
| 2011/0175024 A1* | 7/2011 | Lang | C04B 35/565 |
| | | | 252/182.32 |

FOREIGN PATENT DOCUMENTS

| | | |
|---|---|---|
| JP | 62-12608 A | 1/1987 |
| JP | 2000-044223 A | 2/2000 |
| JP | 2005-206441 A | 8/2005 |
| JP | 2010-030839 A | 2/2010 |
| WO | 01/74712 A1 | 10/2001 |
| WO | 2010/037692 A1 | 4/2010 |

OTHER PUBLICATIONS

International Preliminary Report on Patentability mailed Jan. 7, 2014 for the corresponding International Application No. PCT/JP2012/066990.

Extended European Search Report mailed on Mar. 23, 2015 for the corresponding EP Application No. 12806968.9.

State Intellectual Property Office of China Search Report for the corresponding Chinese Application No. 201280032850.9 (and English translation).

* cited by examiner

PARTICLES FORMED OF SILICA AND CARBON, AND METHOD FOR PRODUCING MIXTURE OF SILICA AND CARBON

CROSS REFERENCE TO RELATED APPLICATIONS

This application is a U.S. national stage application of PCT/JP2012/066990 filed on Jul. 3, 2012, and claims priority to, and incorporates by reference, Japanese Patent Application No. 2011-148509 filed on Jul. 4, 2011 and Japanese Patent Application No. 2011-240103 filed on Nov. 1, 2011.

TECHNICAL FIELD

The present invention relates to a particle formed of silica and carbon, and to a method of producing a mixture of silica and carbon (i.e. a silica and carbon-containing material) which is an assembly of such particles.

BACKGROUND ART

The use of a silica ($SiO_2$) and carbon (C)-containing material as starting material for silicon carbides or silicon is known.

An example of a known method for producing silicon carbide using a silica and carbon-containing material involves heating inexpensive silica and a carbonaceous material such as coke as the starting materials to 1500 to 1900° C. so as to induce a reducing reaction between the carbon and the silica and thereby produce silicon carbide of relatively high-purity (see Patent Document 1).

A method for producing a starting material for the production of high-purity silicon using a silica and carbon-containing material involves forming silicon monoxide gas and carbon monoxide gas by reacting a mixture of carbon and a material composed primarily of silicon dioxide at a temperature in the range of 1300 to 1800° C. and under a pressure of 5,000 Pa or lower at the surface of contact between both materials, cooling this gas and solidifying some of the silicon monoxide into a bulk form, then recovering the solidified silicon monoxide, and exhausting the rest of the silicon monoxide (see Patent Document 2). In cases where silicon is produced from silicon monoxide (SiO), the purity of the silicon obtained in the conventional art depends on the purity of the silicon monoxide serving as the starting material. With the method described in Patent Document 2, it is possible to obtain high-purity silicon monoxide that can be used as the starting material for silicon.

PRIOR ART DOCUMENTS

Patent Documents

Patent Document 1: Japanese Patent Application Laid-open No. 2000-044223
Patent Document 2: Japanese Patent Application Laid-open No. 2005-206441

DISCLOSURE OF THE INVENTION

Problems to be Solved by the Invention

The silicon carbide and silicon used in semiconductors and the like are required to be of a high purity. Were it possible to lower the amount of impurities included in the silica and carbon serving as the starting materials for silicon carbide and silicon, high-purity silicon carbide and silicon could be obtained by a simpler method.

In a mixed starting material obtained by dry-mixing silicon particles with carbon particles which are the starting materials for silicon carbide and silicon, the silica particles and the carbon particles are each independently present. Accordingly, there was a problem that the reactivity during firing is poor in the case that these particles have a large diameter in particular.

Moreover, when the silica particles and carbon particles within the mixed starting material is reduced in size to increase their reactivity during firing, there was a problem that metal ingredients which make up the grinder and impurities remaining within the grinder adulterate the mixed starting material during the operation.

It is therefore an object of the invention to provide a particle which is composed of silica and carbon, which has a low content of impurities, and in which the reactivity of the silica and carbon during firing is excellent.

Another object of the invention is to provide a method for the easy and low-cost production of a silica and carbon-containing material that is an assembly of particles each of which is composed of silica and carbon, which have a low content of impurities, and in which the reactivity of the silica and carbon during firing is excellent.

Means for Solving the Problems

The inventors have conducted extensive investigations in order to resolve the above problems, and have discovered that the former one of the above objects can be achieved with a particle formed of silica and carbon, wherein the silica and carbon is distributed throughout the particle interior and wherein the particle has a low content of impurities.

Moreover, the inventors have found that the latter one of the above objects can be achieved by a method wherein a specific aqueous alkali silicate solution is mixed with carbon, then the resulting mixture is mixed with a mineral acid so as to cause particles formed of silica and carbon to precipitate, following which solid-liquid separation is carried out on the liquid substance containing the particles, thereby obtaining a solid portion containing an assembly of the particles (i.e. particles each of which is formed of silica and carbon).

That is, the invention provides [1] to [14] below.
[1] A particle formed of silica and carbon, wherein the silica and carbon are each distributed throughout the particle interior and respective contents of boron (B) and phosphorus (P) are not more than 1 ppm.
[2] The particle formed of silica and carbon according to [1] above, having, in a region accounting for at least 90 vol % of the particle interior, a silica content of not more than 90 wt % and a carbon content of at least 10 wt %.
[3] The particle formed of silica and carbon according to [1] or [2] above, having aluminum, iron, magnesium, calcium and titanium contents of, respectively, not more than 5 ppm, not more than 5 ppm, not more than 5 ppm, not more than 5 ppm, and not more than 1 ppm.
[4] A method of producing a silica and carbon-containing material which is an assembly of particles formed of silica and carbon according to any one of [1] to [3] above, this method including: (B) a carbon mixing step of mixing an aqueous alkali silicate solution having a silicon concentration within a liquid portion of at least 10 wt % with carbon so as to obtain a carbon-containing aqueous alkali silicate solution; and (C) a silica recovery step of mixing the carbon-containing aqueous alkali silicate solution obtained in the step (B) with a mineral acid so as to cause carbon (C) and silicon (Si) within the liquid portion to precipitate as particles formed of silica and carbon and thus obtain a particle-containing liquid substance, then solid-liquid separating the particle-containing liquid substance so as to obtain a solid portion that contains a silica and carbon-containing material which is an assembly of particles formed of silica and carbon and a liquid portion that contains impurities.

[5] The method of producing a silica and carbon-containing material according to [4] above, this method further including: (D) an acid washing step of mixing the solid portion that contains the silica and carbon-containing material obtained in the step (C) with an acid so as to prepare an acid slurry having a pH of less than 3.0, thereby dissolving the impurities remaining in the solid portion, then solid-liquid separating the acidic slurry so as to obtain a solid portion that contains the silica and carbon-containing material and a liquid portion that contains impurities.

[6] The method of producing a silica and carbon-containing material according to [4] or [5] above, this method further including: (E) a water washing step of mixing the solid portion that contains the silica and carbon-containing material obtained in the former step (i.e. a step conducted before step (E) without having an intermediate step between these steps) with water so as to prepare a slurry, thereby dissolving the impurities remaining in the solid portion, then solid-liquid separating the slurry so as to obtain a solid portion that contains a silica and carbon-containing material and a liquid portion that contains impurities.

[7] The method of producing a silica and carbon-containing material according to any one of [4] to [6] above, wherein, in the step (C), mixing of the carbon-containing aqueous alkali silicate solution and the mineral acid is carried out by adding the carbon-containing aqueous alkali silicate solution to the mineral acid.

[8] The method of producing a silica and carbon-containing material according to any one of [4] to [7] above, wherein, in the step (C), the carbon-containing aqueous alkali silicate solution and the mineral acid are mixed while maintaining the pH at 1.0 or below.

[9] The method of producing a silica and carbon-containing material according to any one of [4] to [8] above, wherein hydrogen peroxide is added in the step (C) or the step (D).

[10] The method of producing a silica and carbon-containing material according to any one of [4] to [9] above, further including, prior to the step (B): (A) an alkali dissolution step of mixing a silica-containing mineral with an aqueous alkali solution so as to prepare an alkaline slurry having a pH of at least 11.5, thereby dissolving, within the liquid portion, silicon (Si) from the silica-containing mineral to a silicon concentration in the liquid portion of at least 10 wt %, then solid-liquid separating the alkaline slurry so as to obtain an aqueous alkali silicate solution and a solid portion.

[11] The method of producing a silica and carbon-containing material according to [10] above, further including, between the step (A) and the step (B): (B1) an impurity recovery step of mixing the aqueous alkali silicate solution obtained in the step (A) with an acid so as to prepare an alkaline slurry having a pH of more than 10.3 and less than 11.5 and a silicon (Si) concentration in the liquid portion of at least 10 wt %, thereby precipitating out impurities within the liquid portion, then solid-liquid separating the alkaline slurry so as to obtain an aqueous alkali silicate solution and a solid portion.

[12] The method of producing a silica and carbon-containing material according to [10] or [11] above, further including, prior to the step (A): (A1) a starting material water rinsing step (i.e. a step of rinsing a starting material by water) of rinsing the silica-containing mineral with water so as to remove clay and organic matter.

[13] The method of producing a silica and carbon-containing material according to any of [10] to [12] above, further including, prior to the step (A): (A2) a starting material firing step (i.e. a step of firing a starting material) of firing the silica-containing mineral at from 300 to 1000° C. for a period of from 0.5 to 2 hours so as to remove organic matter.

[14] Silicon carbide obtained by firing the particle formed of silica and carbon according to any one of [1] to [3] above.

Advantageous Effects of the Invention

Because the particle formed of silica and carbon of the invention has a low impurities content and an excellent reactivity, high-purity silicon carbide and silicon can be obtained by a simple method.

Also, according to the method for producing a silica and carbon-containing material of the invention, owing to the simplicity of the operations and the high treatment efficiency, it is possible to obtain a silica and carbon-containing material, which is an assembly of particles formed of silica and carbon, at a lower production cost in comparison a method based on conventional technology.

Moreover, the silica and carbon-containing material obtained by the production method of the invention has the advantage of having low contents of impurities such as aluminum (Al), iron (Fe), magnesium (Mg), calcium (Ca), titanium (Ti), boron (B), phosphorus (P), and the like.

EMBODIMENTS FOR CARRYING OUT THE INVENTION

In the particle formed of silica and carbon of the invention, the silica and carbon are each distributed throughout the particle interior, and the particle has respective contents of boron and phosphorus of not more than 1 ppm.

The particle formed of silica and carbon has Al, Fe, Mg, Ca and Ti contents of, respectively, not more than 5 ppm, not more than 5 ppm, not more than 5 ppm, not more than 5 ppm, and not more than 1 ppm.

In the particle formed of silica and carbon of the invention, because silica and carbon are each distributed throughout the particle interior, the reactivity during firing is high.

Specifically, in a region accounting for preferably at least 90 vol %, more preferably at least 95 vol %, even more preferably at least 98 vol %, and most preferably 100 vol % in the particle, it is preferable for the silica content to be not more than 90 wt % (i.e. weight % or mass %) and for the carbon content to be at least 10 wt %.

At any point within the particle, the silica content is preferably not more than 90 wt %, more preferably from 60 to 90 wt %, even more preferably from 60 to 80 wt %, and most preferably from 60 to 70 wt %, and the carbon content is preferably at least 10 wt %, more preferably from 10 to 40 wt %, even more preferably from 20 to 40 wt %, and most preferably from 30 to 40 wt %.

Also, from the standpoint of the ease of particle production, it is preferable for the carbon content to gradually decrease from the center portion toward the edge of the particle. Specifically, a particle having a carbon content of from 30 to 40 wt % at the center of the particle, a carbon content of from 20 to 30 wt % in the region intermediate between the center and the edge, and a carbon content of from 10 to 20 wt % at or near the edge is preferred.

By setting the content of impurities (B, P, etc.) within the above range, the particle formed of silica and carbon can be advantageously used as a starting material for high-purity silicon carbide (SiC) or as a starting material for high-purity silicon (Si).

For example, by firing the particle formed of silica and carbon, a high-purity silicon carbide can be obtained. In cases where silicon carbide is obtained by firing the particle formed of silica and carbon of the invention, the compounding molar ratio of C and $SiO_2$ ($C/SiO_2$) is preferably from 1.5 to 4.5. The firing temperature is preferably from 1500 to 2500° C.

When silicon carbide is obtained by firing particles formed of silica and carbon, either or both of silica and carbon may be added so as to prevent silica or carbon from remaining behind rather than becoming silicon carbide.

The combined content of silica and carbon in the particles formed of silica and carbon of the invention is preferably at least 99.0 wt %, more preferably at least 99.5 wt %, and most preferably at least 99.9 wt %.

The size of the particles formed of silica and carbon of the invention is not particularly limited, but the length of the particle (i.e. the length having the largest value in a particle) is generally not more than 500 μm, preferably not more than 400 μm, and more preferably not more than 300 μm.

An example of the inventive method for producing a silica and carbon-containing material is described below. In this specification, "silica and carbon-containing material" refers to an assembly of the above-described silica and carbon-containing particles (that is, particles each of which is a silica and carbon-containing particle).

Of the following Steps (A1) to (E), Step (B) and Step (C) are essential steps in the invention. Step (A) is a step which is added in cases where an aqueous alkali silicate solution is prepared using a silica-containing mineral as the starting material. Steps (A1), (A2), (B1), (D) and (E) are steps which are not essential to the invention, and may be optionally added.

[Step (A1): Starting Material Water Rinsing Step]

Step (A1) is a step in which a silica-containing mineral (in the form of rocks or powder) is rinsed (washed) with water so as to remove clay and organic matter. The water-rinsed silica-containing mineral is generally also dewatered using, for example, a filter press.

Illustrative examples of silica-containing minerals include diatomaceous earth and siliceous shale. It is desirable for the silica-containing mineral to have a high solubility in alkalis.

Here, "diatomaceous earth" refers to deposits of diatom shells composed primarily of amorphous silica which accumulate over a long period of time when diatoms sink to the bottom of a sea or lake and the protoplasm and other organic matter within the diatom bodies decompose.

As used herein, "siliceous shale" refers to shale which originates from the remains of siliceous organisms. Diatoms and other plankton having siliceous shells live in the ocean. When these plankton die and accumulate at the bottom of the sea, the organic matter within the dead plankton gradually decomposes, leaving only the siliceous ($SiO_2$; silica) shells behind. With the passage of time and changes in temperature and pressure, these siliceous shells (i.e. siliceous deposits) are diagenetically altered and transformed into hard rock, becoming siliceous shale. The silica within siliceous deposits, under diagenetic effects, crystallizes from amorphous silica to cristobalite and tridymite, then changes further to quartz.

Diatomaceous earth is composed of opal A which is primarily amorphous silica. Siliceous shale contains primarily opal CT or opal C, in which crystallization has proceeded from opal A. "Opal CT" is a silica mineral composed of a cristobalite structure and a tridymite structure. Opal C is a silica mineral composed of a cristobalite structure. Of these, in the present invention, the use of siliceous shale composed primarily of opal CT is preferred.

Figure 1:
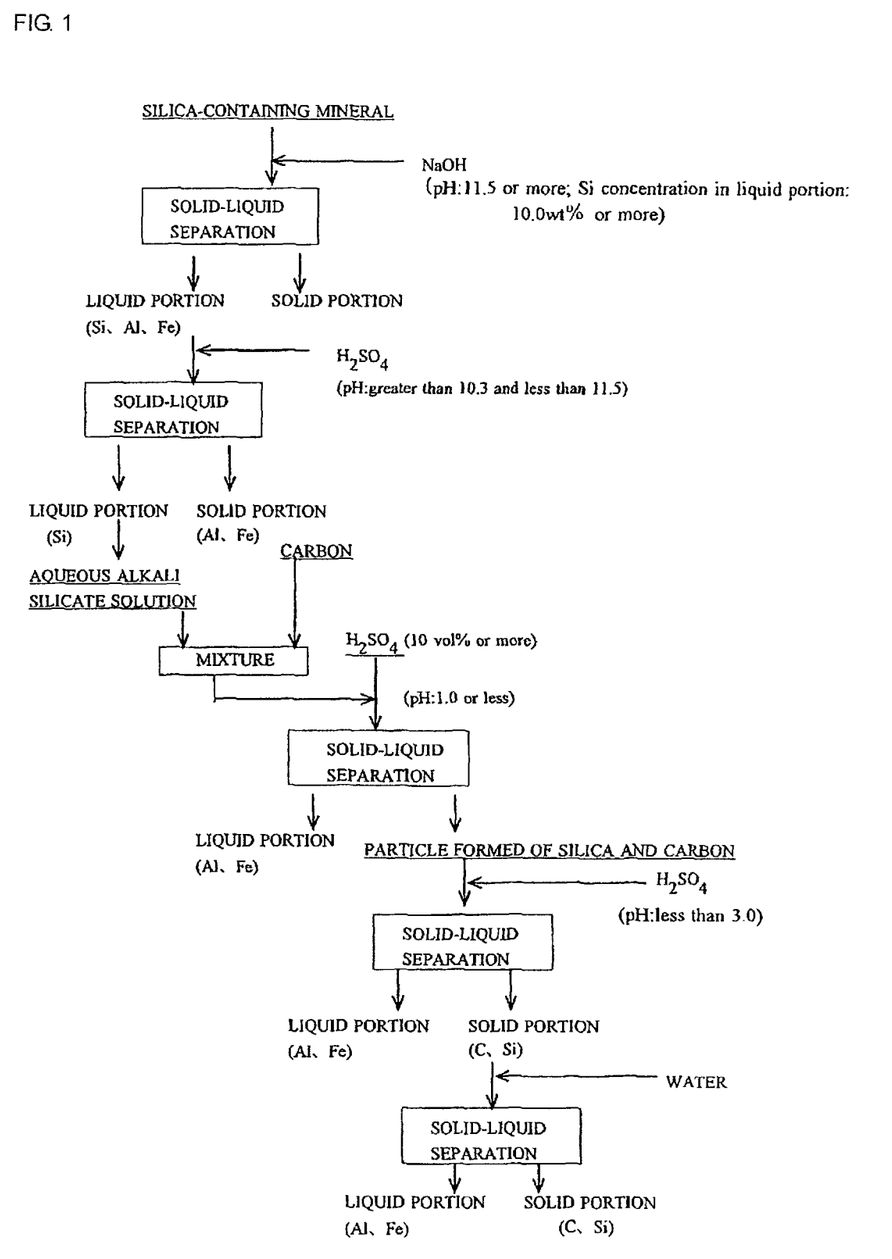
FIG. 1 is a flow chart showing an embodiment of the method of producing a silica and carbon-containing material of the invention.
Figure 2:
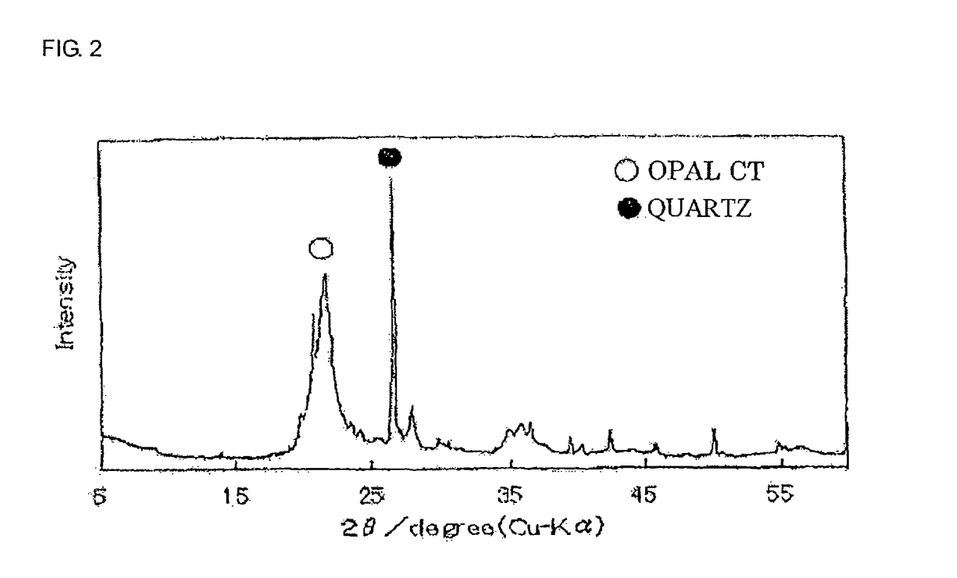
FIG. 2 is a graph showing the powder x-ray diffraction intensities obtained using the Cu-Kα line for an example of siliceous shale.

Moreover, in powder x-ray diffraction using the Cu-Kα line, the diffraction intensity at $2\theta=21.5$ to $21.9°$ (deg) for opal CT relative to the diffraction intensity at the $2\theta=26.6°$ peak top for quartz, expressed as a ratio with respect to an arbitrary value of 1 for quartz, is preferably from 0.2 to 2.0, more preferably from 0.4 to 1.8, and most preferably from 0.5 to 1.5. When this value is less than 0.2, the amount of opal CT having a high reactivity is low, as a result of which the silica yield decreases. On the other hand, when this value exceeds 2.0, siliceous shale in which the amount of opal CT is much higher than the amount of quartz is uneconomical owing to the scarcity of resources.

The ratio of the diffraction intensity for opal CT with respect to the diffraction intensity for quartz is determined by the following equation.

Ratio of diffraction intensity for opal CT to diffraction intensity for quartz=(diffraction intensity at 21.5 to 21.9° peak top)/(diffraction intensity at 26.6° peak top)

Figure 3:
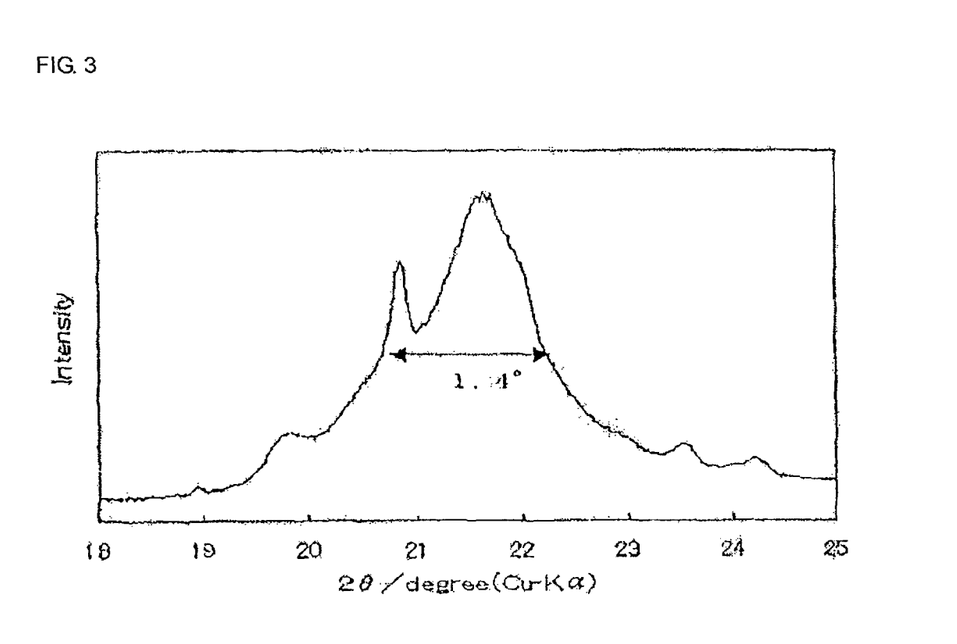
FIG. 3 is a graph showing the half-width of opal CT for an example of siliceous shale.

In powder x-ray diffraction analysis of siliceous shale using the Cu-Kα line, the half-width of the peak that exists in the interval 2θ=21.5 to 21.9° for opal CT is preferably at least 0.5°, more preferably at least 0.75°, and most preferably at least 1.0°. In cases where this value is less than 0.5°, the bond strength of opal CT crystals increases, the reactivity with alkali decreases, and the silica yield declines. Here, "half-width" refers to the width of the diffraction curve at one-half the peak-top diffraction intensity.

The content of silica ($SiO_2$) within the siliceous shale used in the invention is preferably at least 70 wt %, and more preferably at least 75 wt %. At a content of at least 70 wt %, higher purity silica can be produced at a low cost.

The silica-containing mineral can be obtained by, for example, grinding a silica-containing mineral such as siliceous shale with a size-reducing apparatus (e.g., a jaw crusher, a top grinder mill, a cross beater mill or a ball mill).

[Step (A2): Starting Material Firing Step]

Step (A2) is a step in which a silica-containing mineral is fired (i.e. heated) at 300 to 1000° C. for 0.5 to 2 hours so as to remove organic matter.

When both Step (A1) and (A2) are carried out, the order of these steps is not particularly limited.

[Step (A): Alkali Dissolution Step]

Step (A) is an alkali dissolution step in which a silica-containing mineral and an aqueous alkali solution are mixed so as to prepare an alkaline slurry having a pH of at least 11.5, thereby dissolving silicon (Si) from the silica-containing mineral into the liquid portion to a silicon concentration in the liquid portion of at least 10 wt %, then solid-liquid separating the alkaline slurry so as to obtain an aqueous alkali silicate solution and a solid portion.

Here, in the specification, "aqueous alkali silicate solution" refers to an alkaline aqueous solution containing a substance which includes silica ($SiO_2$) within the chemical formula.

The pH of the alkaline slurry obtained by mixing the silica-containing mineral and the aqueous alkali solution is at least 11.5, preferably at least 12.5, and more preferably at least 13.0. At a pH below 11.5, the silica cannot be fully dissolved and silica remains within the solid portion, as a result of which the yield of silica obtained decreases.

An aqueous sodium hydroxide solution, an aqueous potassium hydroxide solution or the like may be used as the aqueous alkali solution for adjusting the pH within the above numerical range.

The solid-liquid ratio of the slurry (i.e. weight of silica-containing mineral per liter of aqueous alkali solution) is preferably from 100 to 500 g/L, and more preferably from 200 to 400 g/L. At a solid-liquid ratio of less than 100 g/L, the treatment efficiency decreases; for example, the time required for solid-liquid separation of the slurry increases. On the other hand, at a solid-liquid ratio of more than 400 g/L, it may not be possible to fully dissolve out silica and the like.

The slurry is generally stirred for a given period of time (e.g., from 30 to 90 minutes).

The stirred slurry is separated into a solid portion and a liquid portion using solid-liquid separating means such as a filter press. The liquid portion is an aqueous alkali silicate solution containing silicon and other ingredients (i.e. impurities such as Al, Fe and the like), and is treated in subsequent Step (B1) or Step (C). The Si concentration included in the liquid portion is at least 10 wt %, preferably from 10 to 20 wt %, more preferably from 12 to 18 wt %, and most preferably from 13 to 16 wt %. At a Si concentration of less than 10 wt %, a gel-like carbon-containing silica may precipitate out in the subsequently described Step (C) and solid-liquid separation takes time, in addition to which the amount of silica and carbon-containing material obtained decreases.

In Step (A), from the standpoint of energy cost, the liquid temperature when obtaining the alkaline slurry is preferably from 5 to 100° C., more preferably from 10 to 80° C., and most preferably from 10 to 40° C. By maintaining the liquid temperature within the above range, the treatment efficiency can be increased.

[Step (B1): Impurity Recovery Step]

Step (B1) is a step in which the aqueous alkali silicate solution obtained in Step (A) is mixed with an acid so as to prepare an alkaline slurry having a pH greater than 10.3 and less than 11.5 and a silicon concentration in the liquid portion of at least 10 wt %, thereby precipitating out impurities other than Si (e.g., Al and Fe) within the liquid portion, then solid-liquid separating the alkaline slurry so as to obtain an aqueous alkali silicate solution and a solid portion.

The impurities which are not recovered in Step (B1) and remain within the liquid portion are recovered in Step (C) and subsequent steps.

In Step (B1), the pH of the liquid portion after mixture with an acid is more than 10.3 and less than 11.5, is preferably from 10.4 to 11.0, and is more preferably from 10.5 to 10.8. At a pH of 10.3 or less, Si also precipitates out together with impurities (such as Al and Fe). On the other hand, at a pH of 11.5 or more, sufficient precipitation does not occur and the amount of impurities remaining within the liquid portion increases.

The concentration of Si included in the liquid portion after mixture with an acid is at least 10 wt %, preferably from 10 to 20 wt %, more preferably from 12 to 18 wt %, and most preferably from 13 to 16 wt %. At a Si concentration of less than 10 wt %, a gel-like carbon-containing silica may precipitate out in the subsequently described Step (C) and solid-liquid separation takes time, in addition to which the amount of silica and carbon-containing material obtained decreases.

The acid used to adjust the pH within the above numerical range may be, for example, sulfuric acid, hydrochloric acid or oxalic acid.

After pH adjustment, separation into a solid portion and a liquid portion is carried out using solid-liquid separating means such as a filter press.

Of these, the solid portion (i.e. cake) includes impurities (e.g., Al and Fe).

The liquid portion includes Si, and is treated in the subsequently step (C) described later.

From the standpoint of energy costs, the liquid temperature when carrying out pH adjustment in this step is preferably from 5 to 100° C., more preferably from 10 to 80° C., and most preferably from 10 to 40° C. By maintaining the liquid temperature within the above range, the treatment efficiency can be increased.

[Step (B): Carbon Mixing Step]

Step (B) is a step in which an aqueous alkali silicate solution (i.e. an alkaline silicate aqueous solution) having a Si concentration within a liquid portion of at least 10 wt % is mixed with carbon so as to obtain a carbon-containing aqueous alkali silicate solution.

The aqueous alkali silicate solution used in Step (B) is not particularly limited, and examples thereof include the aqueous alkali silicate solution obtained in the previous step (i.e. Step (A) or Step (B1)), and water glass.

The water glass used in the invention may be a commercially available product. Aside from those water glasses bearing the designations No. 1, No. 2 and No. 3 according to JIS specifications, products manufactured and sold by various water glass manufacturers which fall outside of JIS specifications may also be used.

The Si concentration included in the aqueous alkali silicate solution is at least 10 wt %, preferably from 10 to 20 wt %, more preferably from 12 to 18 wt %, and most preferably from 13 to 16 wt %. At a Si concentration below 10 wt %, a gel-like carbon-containing silica may precipitate out in Step (C) and solid-liquid separation takes time, in addition to which the amount of silica and carbon-containing material obtained decreases.

At a Si concentration above 20 wt %, handling (i.e. transport, etc.) of the aqueous alkali silicate solution may worsen and the removal of impurities may be inadequate.

Examples of the carbon used in the invention include, but are not particularly limited to, petroleum coke, coal pitch, carbon black and various organic resins.

The particle size of the carbon is preferably not more than 5 mm, and more preferably not more than 2 mm. At a particle size greater than 5 mm, removal of the impurities may be inadequate.

The proportion of carbon within the above preferred range in particle size is preferably at least 80 wt %, and more preferably at least 90 wt %, of the overall carbon.

As used herein, "particle size of the carbon" refers to the maximum dimensions within a carbon particle (e.g., in cases where the cross-section is elliptical, the major axis of the ellipse).

The method of the invention may also include, prior to Step (B), the step of size-reducing the carbon to the above-indicated particle size range.

The mixing method, although not particularly limited, is preferably a method in which the carbon is added to the aqueous alkali silicate solution.

The admixture of carbon in Step (B) enables impurities from the carbon within the resulting silica and carbon-containing material to be greatly reduced. In the subsequently Step (C) described later, particles which are formed of silica and carbon and in which the silica and carbon have been uniformly taken up at the interior can be precipitated out.

[Step (C): Silica Recovery Step]

This is a step in which the carbon-containing aqueous alkali silicate solution obtained in Step (B) is mixed with a mineral acid so as to cause carbon and silicon within the liquid portion to precipitate out as a particle formed of silica and carbon (i.e. non-gel-like carbon-containing precipitated silica) and thus obtain a particle-containing liquid substance, following which the liquid substance is solid-liquid separated so as to obtain a solid portion that contains a silica and carbon-containing material which is an assembly of particles formed of silica and carbon and a liquid portion that contains impurities.

The particles formed of silica and carbon form concurrent with mixture of the carbon-containing aqueous alkali silicate solution and the mineral acid.

Examples of the mineral acid used in this step include sulfuric acid, hydrochloric acid and nitric acid. The use of sulfuric acid is preferred from the standpoint of lowering the cost of chemicals.

The concentration of the mineral acid is preferably at least 1 vol %, more preferably from 5 to 20 vol %, and most preferably from 10 to 15 vol %. At a mineral acids concentration below 1 vol %, both a particle formed of silica and carbon and a gel-like carbon-containing silica may form. With the formation of such a gel-like carbon-containing silica, the concentration of impurities within the final product rises. A concentration in excess of 20 vol % is undesirable from the standpoint of cost.

The method of mixing the carbon-containing aqueous alkali silicate solution and the mineral acid is not particularly limited, although a method involving addition of the carbon-containing aqueous alkali silicate solution to the mineral acid is preferred from the standpoint of inducing the formation of only a particle formed of silica and carbon. Illustrative examples include a method in which the carbon-containing aqueous alkali silicate solution is added to the mineral acid dropwise, and a method in which the carbon-containing aqueous alkali silicate solution is forced out directly into the mineral acid from a tube having a diameter of at least 1.0 mm, and preferably at least 4.0 mm.

The pH during mixture is preferably 1.0 or less, and more preferably 0.9 or less. At a pH above 1.0, a gel-like carbon-containing silica may precipitate out and solid-liquid separation takes time, in addition to which the amount of silica and carbon-containing material obtained decreases.

No limitation exists on the rate of outflow by the carbon-containing aqueous alkali silicate solution into the mineral acid. However, when the pH at the time of mixture is greater than 1.0 and the rate of outflow is large, there is a possibility that a particle formed of silica and carbon will not form, or that a particle formed of silica and carbon and a gel-like carbon-containing silica will both form.

In this step, the temperature at which a particle formed of silica and carbon is precipitated out during mixture of the carbon-containing aqueous alkali silicate solution and the mineral acid is not particularly limited, but is preferably from 10 to 80° C., more preferably from 15 to 40° C., and most preferably from 20 to 30° C. A standard temperature (e.g., 10 to 40° C.) is typically used. When this temperature exceeds 80° C., the energy costs rise and equipment corrosion tends to occur.

After the C and Si in the carbon-containing aqueous alkali silicate solution have been precipitated out as a particle formed of silica and carbon, solid-liquid separating means such as a filter press is used to carry out separation into a solid portion containing a silica and carbon-containing material which is an assembly of the particles formed of silica and carbon, and an impurity-containing liquid portion. Because the resulting silica and carbon-containing material, rather than being gel-like, is in the form of particles, the time required for solid-liquid separation can be shortened.

The silica and carbon-containing material within the solid portion obtained in Step (C) is a silica and carbon-containing material having a reduced amount of impurities such as Al, Fe, Mg, Ca, Ti, B and P.

Because the resulting silica and carbon-containing material is composed of a particle wherein silica and carbon are each distributed throughout the particle interior, the reactivity during firing (i.e. calcinating) is high, enabling high-purity silicon carbide and silicon to be easily obtained.

In Step (C), at least one of the carbon-containing aqueous alkali silicate solution and the mineral acid may be mixed with hydrogen peroxide.

By such mixture with hydrogen peroxide, it is possible to obtain a silica and carbon-containing material which has a reduced amount of impurities (especially Ti).

The mixing method is not particularly limited, and examples thereof include: (1) a method of mixing the carbon-containing aqueous alkali silicate solution with hydrogen peroxide, then mixing the resulting mixture with the mineral acid; (2) a method of mixing the mineral acid with hydrogen peroxide, then mixing the resulting mixture with the carbon-containing aqueous alkali silicate solution; (3) a method of mixing the carbon-containing aqueous alkali silicate solution with the mineral acid, then mixing the resulting mixture with hydrogen peroxide; and (4) a method of simultaneously mixing the carbon-containing aqueous alkali silicate solution with the mineral acid and the hydrogen peroxide. Of these, from the standpoint of reducing impurities on the upstream side of this step, the above-mentioned method (1) or (2) is preferred.

The amount of hydrogen peroxide added, relative to the combined weight (100 wt %) of the carbon (C) and the silica ($SiO_2$), is preferably from 0.1 to 15 wt %, more preferably from 0.1 to 10 wt %, and most preferably from 0.1 to 5 wt %. At an amount of addition below 0.1 wt %, the impurity (e.g., Ti) lowering effects are inadequate. At an amount of addition greater than 15 wt %, the impurity-reducing effect reaches a state of saturation.

When the mineral acid used in Step (C) is sulfuric acid, by subjecting the impurity-containing liquid portion obtained in Step (C) to neutralization treatment, the impurities within the liquid portion are caused to precipitate out as gypsum. The gypsum can be reused as a starting material for cement.

[Step (D): Acid Washing Step]

Step (D) (i.e. acid washing step) can be suitably carried out on the solid portion containing the silica and carbon-containing material which is an assembly of the particles formed of silica and carbon obtained in Step (C). By carrying out the acid washing step, a silica and carbon-containing material having a reduced amount of impurities can be obtained.

Step (D) is a step wherein the solid portion that contains the silica and carbon-containing material which is an assembly of particles formed of silica and carbon and obtained in Step (C) is mixed with an acid so as to prepare an acid slurry having a pH of less than 3.0, thereby dissolving impurities (e.g., Al, Fe) remaining in the solid portion, then the acidic slurry is solid-liquid separated so as to obtain a solid portion that contains the silica and carbon-containing material which is an assembly of the particles formed of silica and carbon and a liquid portion that contains impurities (e.g., Al, Fe).

The pH of the acidic slurry in this step is less than 3.0, and preferably 2.0 or less. By adjusting the pH of the acidic slurry within this range and carrying out acid washing, impurities such as the trace amounts of aluminum substances and iron substances remaining in the solid portion obtained in Step (C) can be dissolved and induced to migrate into the liquid portion, thereby enabling the content of C and $SiO_2$ within the solid portion to be increased, in addition to which a silica and carbon-containing material with a further reduced amount of impurities can be obtained.

Examples of acids that may be used to adjust the pH within the above-indicated numerical range include sulfuric acid, hydrochloric acid and oxalic acid.

After pH adjustment, solid-liquid separating means such as a filter press is used for separation into a solid portion and a liquid portion.

The liquid temperature when carrying out pH adjustment in this step is not particularly limited. However, from the standpoint of energy costs, the liquid temperature is preferably from 10 to 80° C., more preferably from 15 to 40° C., and most preferably from 20 to 30° C. A standard temperature (e.g., 10 to 40° C.) is typically used. By setting the liquid temperature in the foregoing range, the treatment efficiency can be increased.

The liquid portion obtained by the acid washing step may be recovered and reused as the mineral acid used in Step (C) and as the acid used in Step (D).

In the practice of the invention, in Step (D), a silica and carbon-containing material having a reduced amount of impurities (especially Ti) can be obtained by mixing an acid and hydrogen peroxide, instead of using hydrogen peroxide in Step (C), or when used together with the hydrogen peroxide in Step (C).

The mixing method is not particularly limited, and the examples thereof include: (1) a method of mixing the solid portion that includes the silica and carbon-containing material obtained in Step (C) with hydrogen peroxide, then mixing the resulting mixture with acid; (2) a method of mixing the acid and hydrogen peroxide, then mixing the resulting mixture with the solid portion that includes the silica and carbon-containing material obtained in Step (C); (3) a method of mixing the solid portion that includes the silica and carbon-containing material obtained in Step (C) with the acid, then mixing the resulting mixture with hydrogen peroxide; and (4) a method of simultaneously mixing the solid portion that includes the silica and carbon-containing material obtained in Step (C) with the acid and hydrogen peroxide. Of these, from the standpoint of reducing impurities on the upstream side of this step, the above-mentioned method (1) or (2) is preferred.

The amount of hydrogen peroxide added, relative to the combined weight (100 wt %) of the carbon (C) and the silica ($SiO_2$), is preferably from 0.1 to 15.0 wt %, more preferably from 0.1 to 10.0 wt %, and most preferably from 0.1 to 5.0 wt %. At an amount of hydrogen peroxide addition below 0.1 wt %, the impurity (e.g., Ti) lowering effects are inadequate. At an amount of addition greater than 15.0 wt %, the impurity-reducing effect reaches a state of saturation.

[Step (E): Water Washing Step]

This is a step in which the solid portion that includes the silica and carbon-containing material which is an assembly of the particles formed of silica and carbon obtained in the preceding step (Step (C) or Step (D)) is mixed with water so as to prepare a slurry, thereby dissolving the impurities remaining in the solid portion, following which the slurry is solid-liquid separated so as to obtain a solid portion that includes a silica and carbon-containing material which is an assembly of the particles formed of silica and carbon and a liquid portion that contains impurities. By suitably carrying out water washing (i.e. water rinsing), the trace amount of sodium, sulfur and the like remaining in the solid portion obtained in the preceding step is dissolved and can be induced to migrate into the liquid portion, thereby enabling the C and $SiO_2$ contents within the solid portion to be increased and moreover making it possible to obtain a silica and carbon-containing material having a reduced amount of impurities.

After water washing, solid-liquid separating means such as a filter press is used for separation into a solid portion and a liquid portion.

A water washing step may additionally be carried out on the solid portion obtained in this step.

The liquid portion obtained by the water washing step may be recovered and reused as the water used in Step (A1), Step (A), Step (C), Step (D) and Step (E).

[Other Steps that May be Added]

In addition, in this invention, ion-exchange treatment and/or active carbon treatment may be carried out, as necessary, between Step (A) and Step (B).

The impurities collected by ion-exchange treatment and/or active carbon treatment are of at least one type selected from the group consisting of boron (B), phosphorus (P), aluminum (Al), iron (Fe), sodium (Na), titanium (Ti), calcium (Ca), potassium (K) and magnesium (Mg).

Ion exchange treatment can be carried out using an ion-exchange medium such as a chelating resin, an ion-exchange resin, or the like.

The type of ion-exchange resin may be set as appropriate while taking into consideration the selectivity for the target atoms to be removed. For example, when boron is to be removed, a chelating resin having glucamine groups, an ion-exchange resin having N-methylglucamine groups, or the like may be used.

The form of the ion-exchange medium is not particularly limited and may include, for example, beads, fibers and cloth. The method of passing the liquid portion through the ion-exchange medium is not also particularly limited and may be, for example, a method which entails filling a column with a chelating resin or an ion-exchange resin, and continuously passing the liquid portion through the resin-filled column.

The temperature of the liquid when carrying out ion-exchange treatment and/or active carbon treatment is not particularly limited, provided it is no higher than the maximum temperature that the material used in the respective treatment is capable of enduring.

The solid portion which includes the silica and carbon-containing material that is an assembly of particles formed of silica and carbon and has been ultimately obtained by the production method of the invention can be subjected to drying treatment and/or firing treatment (i.e. calcinating treatment). The conditions of drying treatment and/or firing treatment are 1 to 5 hours at 100 to 400° C.

The solid portion which includes the silica and carbon-containing material that has been ultimately obtained is dissolved in an alkali solution (e.g., sodium hydroxide). By using the resulting solution as the aqueous alkali silicate solution in Step (B) and repeating Steps (B) to (E) a plurality of times, a silica and carbon-containing material having a further reduced amount of impurities can be obtained.

The silica and carbon-containing material obtained by the production method of the invention has high carbon and silica contents and low contents of impurities such as Al, Fe, Mg, Ca and Ti.

The combined content of C and $SiO_2$ in the silica and carbon-containing material obtained by the production method of the invention is preferably at least 99.0 wt %. It is preferable for the contents of Al, Fe, Mg, Ca, Ti, B and P to be respectively not more than 5 ppm, not more than 5 ppm, not more than 5 ppm, not more than 5 ppm, not more than 1 ppm, not more than 1 ppm and not more than 1 ppm.

EXAMPLES

The invention is now explained in more detail with reference to Examples and the invention is not intended to be limited to these Examples.

Example 1

A water glass solution having a Si concentration of 10 wt % was obtained by adding 35 g of water to 140 g of a water glass solution (available from Fuji Chemical Industrial Co., Ltd.; $SiO_2/Na_2O$ (molar ratio)=3.20) and mixing.

Next, 27.0 g of carbon (available from Tokai Carbon Co., Ltd.; average particle diameter: 1 mm; proportion of particles having a particle size at or below 2 mm: at least 90 wt %) was added to and mixed with the resulting water glass solution, thereby giving a carbon-containing water glass solution.

Next, 66.2 g of the resulting carbon-containing water glass solution was added dropwise to 200 g of sulfuric acid having a sulfuric acid concentration of 10.7 vol % (obtained by mixing 20 mL of concentrated sulfuric acid with 165. 6 mL of water), thereby inducing the precipitation of particles formed of silica and carbon (i.e. carbon-containing precipitated silica) at standard temperature (25° C.). The precipitated particles were solid-liquid separated at reduced pressure using a Buchner funnel, thereby giving 33.9 g of solids containing a silica and carbon-containing material which is an assembly of particles formed of silica and carbon, and 232.3 g of a liquid portion containing impurities. The pH was maintained at 1.0 or below up until the completion of dropwise addition.

Next, 200 g of sulfuric acid having a sulfuric acid concentration of 10.7 vol % was added at standard temperature (25° C.) to the resulting solids containing a silica and carbon-containing material, thereby forming a slurry having a pH below 3.0. This slurry was solid-liquid separated, following which the resulting solids were rinsed (i.e. washed) with distilled water. The rinsed solids were then dried at 105° C. for 1 day, yielding 21.3 g of a silica and carbon-containing material.

The concentrations of Al, Fe, Mg, Ca, Ti, B and P in the resulting silica and carbon-containing material were measured. The measurement results are shown in Table 1.

The resulting silica and carbon-containing material was dried, after which the combined amount of C and $SiO_2$ was 99.99 wt % and the Si recovery ratio was 97.0%.

Figure 4:
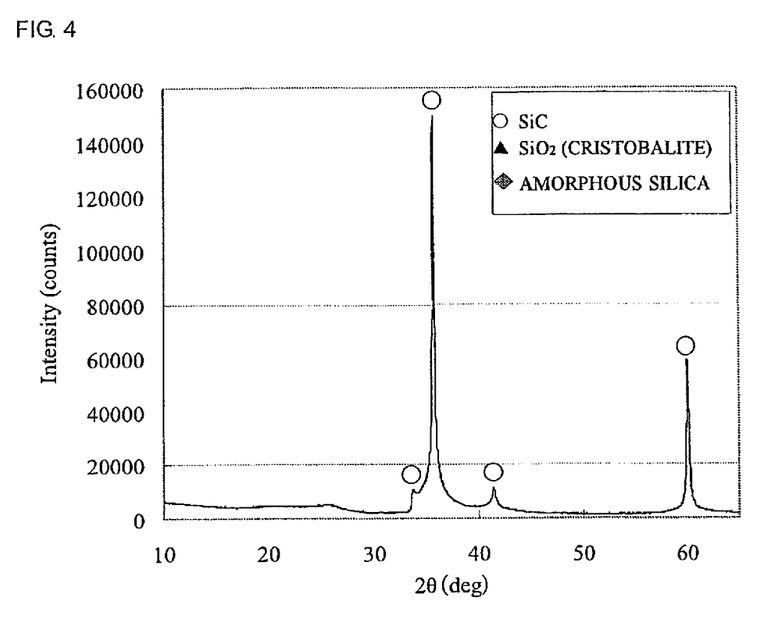
FIG. 4 is a graph showing the powder x-ray diffraction intensity of fired product obtained from the silica and carbon-containing material of the invention when water glass was used as the starting material.

Next, 10 g of the resulting silica and carbon-containing material ($C/SiO_2$ molar ratio: 3.5) was placed in a tube furnace and fired (i.e. calcinated) at 1650° C. for 3 hours in an argon atmosphere. X-ray diffraction analysis was carried out on the resulting fired product. The results are shown in FIG. 4.

Figure 8:
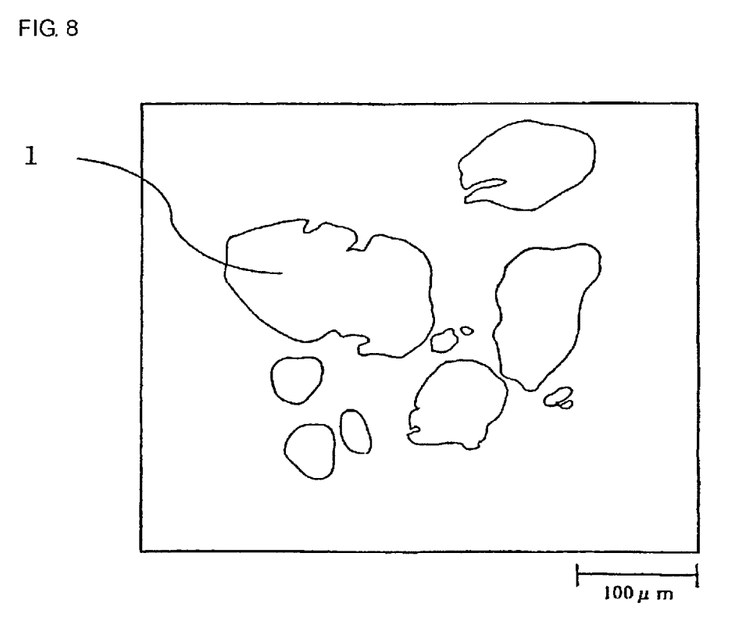
FIG. 8 is a diagram showing in simplified form a photographic image of the silica and carbon-containing material obtained in Example 1.
Figure 9:
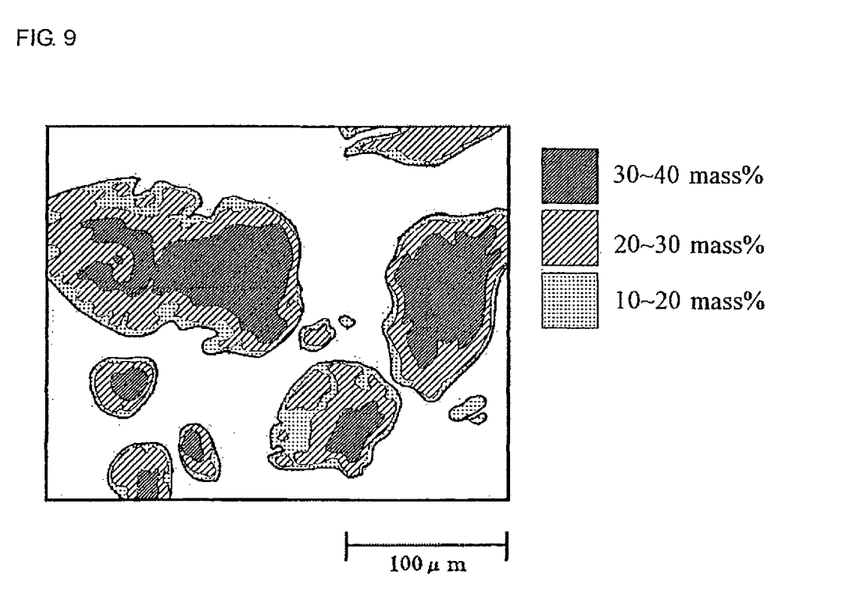
FIG. 9 is a diagram showing in simplified form a photographic image of the carbon content in a sample, as obtained by EPMA analysis in Example 1.
Figure 10:
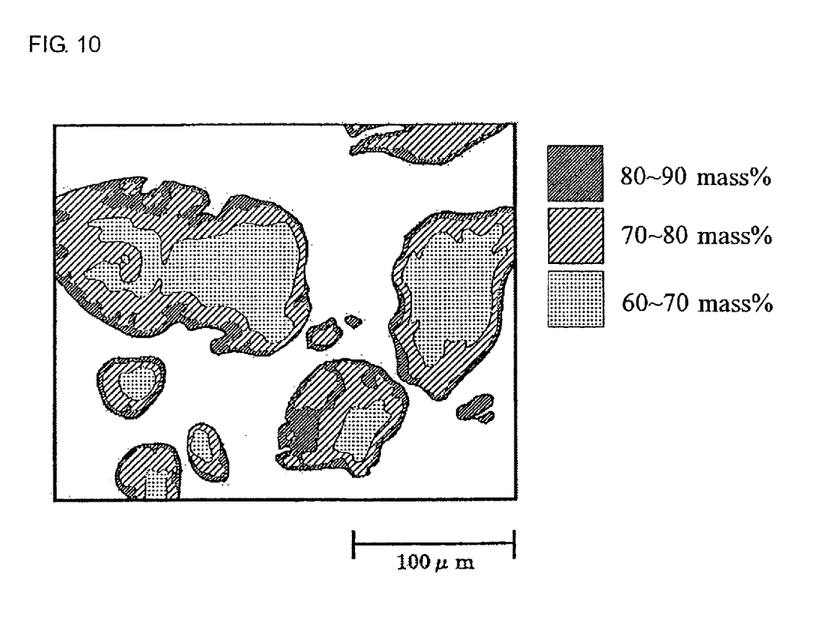
FIG. 10 is a diagram showing in simplified form a photographic image of the silica content in a sample, as obtained by EPMA analysis in Example 1.

In addition, the resulting silica and carbon-containing material was examined using an electron probe microanalyzer (EPMA), and the state of carbon or silica distribution within the particles making up this material was analyzed. Analysis was carried out with an electron beam microanalyzer (manufactured by JEOL Ltd. under the trade name JXA-8100) at an acceleration voltage of 15 kV, a probe diameter of 0.5 μm, a pixel size of 1 μm and a pixel count of 400×400.

FIG. 8 is a diagram showing in simplified form a photographic image of the silica and carbon-containing material.

FIGS. 9 and 10 are diagrams showing in simplified form photographic images of silica and carbon-containing materials. The numbers on the upper right-hand side of each image are the weight percent (wt %) of silica or carbon included in the particles making up the material. Larger numerical values indicate higher contents.

From FIGS. 9 and 10, it is apparent that in regions accounting for 100 vol % of the particle interior, the silica content is 90 wt % or less and the carbon content is 10 wt % or more.

Example 2

A carbon-containing water glass solution was obtained by the addition and mixture of 15.7 g of carbon (available from Tokai Carbon Co., Ltd.; average particle diameter: 1 mm; proportion of particles having a particle size at or below 2 mm: at least 90 wt %) with 100 g of an aqueous alkali silicate solution obtained from siliceous shale (Si concentration, 10 wt %).

Next, 66.2 g of the resulting carbon-containing water glass solution was added dropwise to 200 g of sulfuric acid having a sulfuric acid concentration of 10.7 vol % (obtained by mixing 20 mL of concentrated sulfuric acid with 165.6 mL of water), thereby inducing the precipitation of particles formed of silica and carbon (i.e. carbon-containing precipitated silica) at standard temperature (25° C.). The precipitated particles were solid-liquid separated at reduced pressure using a Buchner funnel, thereby giving 33.8 g of solids containing a silica and carbon-containing material which is an assembly of particles formed of silica and carbon, and 232.4 g of a liquid portion containing impurities. The pH was maintained at 1.0 or below up until the completion of dropwise addition.

Next, 200 g of sulfuric acid having a sulfuric acid concentration of 10.7 vol % was added at standard temperature (25° C.) to the resulting solids containing a silica and carbon-containing material, thereby forming a slurry having a pH below 3.0. This slurry was solid-liquid separated, following which the resulting solids were rinsed with distilled water. The rinsed solids were then dried at 105° C. for 1 day, yielding 21.2 g of a silica and carbon-containing material.

The concentrations of Al, Fe, Mg, Ca, Ti, B and P in the resulting silica and carbon-containing material were measured. The measurement results are shown in Table 1.

The resulting silica and carbon-containing material was dried, after which the combined amount of C and $SiO_2$ was 99.99 wt % and the Si recovery ratio was 96.9%.

Figure 5:
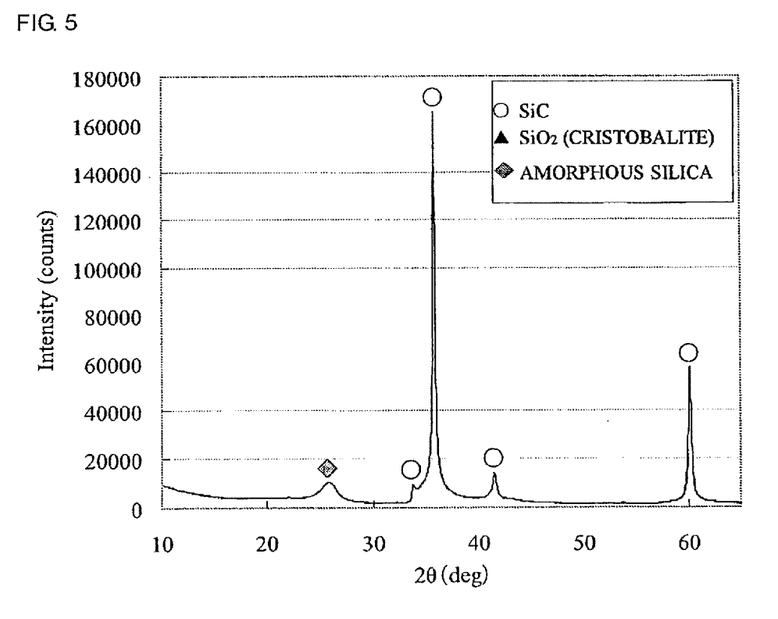
FIG. 5 is a graph showing the powder x-ray diffraction intensity of fired product obtained from the silica and carbon-containing material of the invention when siliceous shale was used as the starting material.

Next, 10 g of the resulting silica and carbon-containing material ($C/SiO_2$ molar ratio: 3.5) was placed in a tube furnace and fired at 1650° C. for 3 hours in an argon atmosphere. X-ray diffraction analysis was carried out on the resulting fired product. The results are shown in FIG. 5.

Comparative Example 1

A water glass solution having a Si concentration of 10 wt % was obtained by the addition and mixture of 35 g of water to 140 g of a water glass solution (available from Fuji Chemical Industrial Co., Ltd.; $SiO_2/Na_2O$ (molar ratio) =3.20).

Next, 66.2 g of the resulting water glass solution was added dropwise to 200 g of sulfuric acid having a sulfuric acid concentration of 10.7 vol % (obtained by mixing 20 mL of concentrated sulfuric acid with 165.6 mL of water), thereby inducing the precipitation of precipitated silica at standard temperature (25° C.). The precipitated particles were solid-liquid separated at reduced pressure using a Buchner funnel, thereby giving 28.9 g of solids containing $SiO_2$ (i.e. precipitated silica) and 237.3 g of a liquid portion containing impurities. The pH was maintained at 1.0 or below up until the completion of dropwise addition.

Next, 200 g of sulfuric acid having a sulfuric acid concentration of 10.7 vol % was added at standard temperature (25° C.) to the resulting solids containing $SiO_2$, thereby forming a slurry having a pH below 3.0. This slurry was solid-liquid separated, following which the resulting solids were rinsed with distilled water. The rinsed solids were then dried at 105° C. for 1 day, yielding 14.5 g of high-purity silica.

Next, 2.8 g of carbon (available from Tokai Carbon Co., Ltd.; average particle diameter: 1 mm; proportion of particles having a particle size at or below 2 mm: at least 90 wt %) was added to and mixed with the resulting high-purity silica, thereby giving a high-purity silica and carbon-containing material.

The concentrations of Al, Fe, Mg, Ca, Ti, B and P in the resulting mixture of high-purity silica and carbon were measured. The measurement results are shown in Table 1.

The resulting high-purity silica and carbon-containing material had C and $SiO_2$ at a combined amount of 99.98 wt % and exhibited a Si recovery rate of 97.0%.

Figure 6:
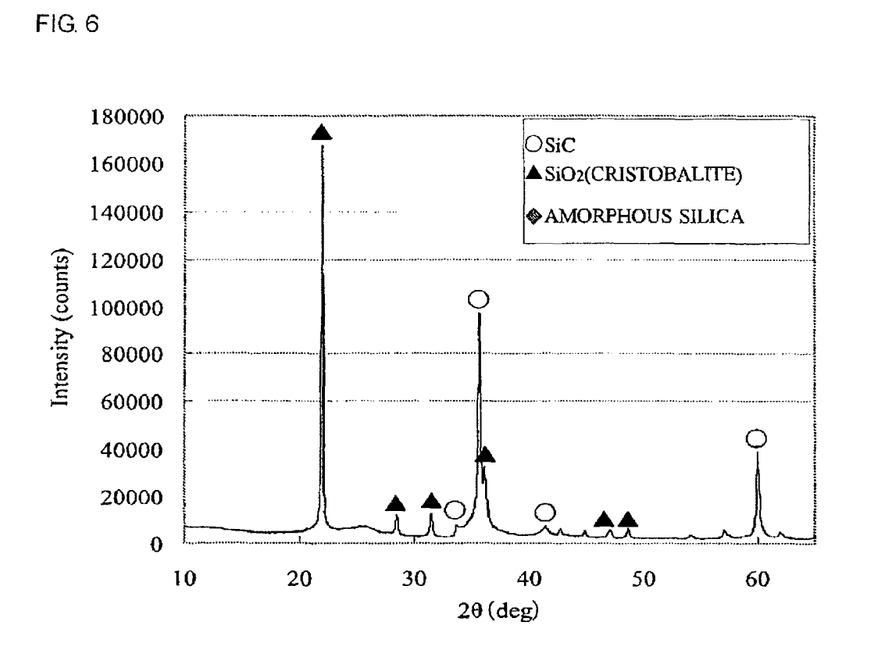
FIG. 6 is a graph showing the powder x-ray diffraction intensity of fired product obtained from a silica and carbon-containing material (when obtained by dry mixing: a dry mixture).

Next, 10 g of the resulting high-purity silica and carbon-containing material ($C/SiO_2$ molar ratio: 3.5) was placed in a tube furnace and fired at 1650° C. for 3 hours in an argon atmosphere. X-ray diffraction analysis was carried out on the resulting fired product. The results are shown in FIG. 6.

Comparative Example 2

First, 2.8 g of carbon (available from Tokai Carbon Co., Ltd.; average particle diameter: 1 mm; proportion of particles having a particle size at or below 2 mm: at least 90 wt %) was added to 28.9 g of $SiO_2$-containing solids (i.e. precipitated silica) obtained by the same procedure as in Comparative Example 1, following which 200 g of sulfuric acid having a sulfuric acid concentration of 10.7 vol % was added at standard temperature (25° C.), giving a slurry having a pH of less than 3.0. This slurry was solid-liquid separated, following which the solids obtained were rinsed with distilled water. The water-rinsed solids were then dried at 105° C. for 1 day, thereby giving 17.3 g of a high-purity silica and carbon-containing material.

The concentrations of Al, Fe, Mg, Ca, Ti, B and P in the resulting silica and carbon-containing material were measured. The measurement results are shown in Table 1.

The resulting high-purity silica and carbon-containing material had C and $SiO_2$ at a combined amount of 99.99 wt % and exhibited a Si recovery rate of 97.0%.

Figure 7:
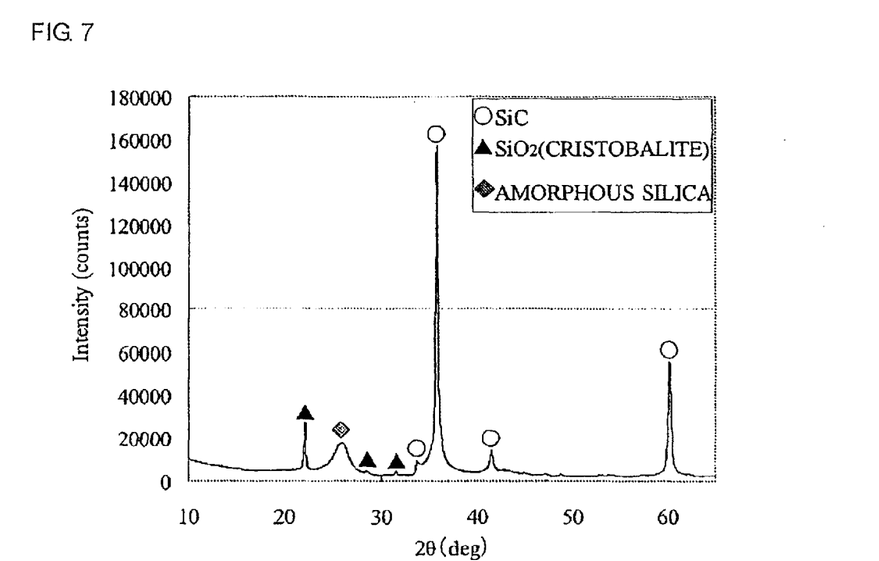
FIG. 7 is a graph showing the powder x-ray diffraction intensity of fired product obtained from a silica and carbon-containing material (when the carbon was added in an acid washing step: a wet mixture).

Next, 10 g of the resulting high-purity silica and carbon-containing material ($C/SiO_2$ molar ratio: 3.5) was placed in a tube furnace and fired at 1650° C. for 3 hours in an argon atmosphere. X-ray diffraction analysis was carried out on the resulting fired product. The results are shown in FIG. 7.

TABLE 1

|  | Al | Fe | Mg | Ca | Ti | B | P |
|---|---|---|---|---|---|---|---|
| Example 1 | <2.5 | 3.0 | 2.0 | 4.9 | <1.0 | <1.0 | <1.0 |
| Example 2 | 4.2 | 4.9 | 2.8 | 5.0 | <1.0 | <1.0 | <1.0 |
| Comparative Example 1 | 21.3 | 32.8 | 26.8 | 16.9 | 2.3 | 1.1 | 13.0 |
| Comparative Example 2 | 9.1 | 8.5 | 11.4 | 9.1 | 1.5 | <1.0 | 2.1 | unit: ppm

It is apparent from the results in Examples 1 and 2 that the silica and carbon-containing material obtained by the method of production of the invention has a small content of impurities (Al, Fe, Mg, Ca, Ti, B, P) compared with Comparative Examples 1 and 2.

Also, from FIGS. 4 to 7, the silica and carbon-containing materials obtained by the production method of the invention have a high reactivity when fired, enabling silicon carbide (SiC) of a higher purity to be obtained by firing than in cases where the high-purity silica and carbon-containing materials obtained in Comparative Examples 1 and 2 are fired.

Moreover, it is apparent from FIGS. 9 and 10 that, in silicon and carbon-containing materials obtained by the production method of the invention, silica and carbon are uniformly distributed at the interior of particles formed of silica and carbon.

EXPLANATION OF REFERENCE NUMERALS 1 particle formed of silica and carbon

The invention claimed is:

1. A method of producing a silica and carbon-containing material which is an assembly of particles formed of silica and carbon, comprising:
  (B) a carbon mixing step of mixing an aqueous alkali silicate solution having a silicon concentration within a liquid portion of at least 10 wt % with carbon to obtain a carbon-containing aqueous alkali silicate solution; and
  (C) a silica recovery step of
    mixing the carbon-containing aqueous alkali silicate solution obtained in the step (B) with a mineral acid while maintaining the pH at 1.0 or below, precipitating particles formed of carbon (C) and silicon (Si) within the liquid portion, and producing a particle-containing liquid substance containing the precipitated particles; and
    solid-liquid separating the particle-containing liquid substance to obtain a solid portion containing a silica and carbon-containing material having an assembly of particles formed of silica and carbon, and a liquid portion containing impurities,
  wherein the silica and carbon in each of the particles formed of silica and carbon are each distributed throughout the particle interior and respective contents of boron (B) and phosphorus (P) are not more than 1 ppm.

2. The method of producing a silica and carbon-containing material according to claim 1, wherein each of the particles formed of silica and carbon has in a region accounting for at least 90 vol % of the particle interior, a silica content of not more than 90 wt % and a carbon content of at least 10 wt %.

3. The method of producing a silica and carbon-containing material according to claim 1, wherein each of the particles formed of silica and carbon has aluminum (Al), iron (Fe), magnesium (Mg), calcium (Ca) and titanium (Ti) contents of, respectively, not more than 5 ppm, not more than 5 ppm, not more than 5 ppm, not more than 5 ppm, and not more than 1 ppm.

4. The method of producing a silica and carbon-containing material according to claim 1, comprising:
  (D) an acid washing step of mixing the solid portion that contains the silica and carbon-containing material obtained in the step (C) with an acid so as to prepare an acid slurry having a pH of less than 3.0, thereby dissolving the impurities remaining in the solid portion, then solid-liquid separating the acidic slurry so as to obtain a solid portion that contains the silica and carbon-containing material and a liquid portion that contains impurities.

5. The method of producing a silica and carbon-containing material according to claim 4, wherein hydrogen peroxide is added in the step (C) or the step (D).

6. The method of producing a silica and carbon-containing material according to claim 1, comprising:
  (E) a water washing step of mixing the solid portion that contains the silica and carbon-containing material obtained in the former step with water so as to prepare a slurry, thereby dissolving the impurities remaining in the solid portion, then solid-liquid separating the slurry so as to obtain a solid portion that contains a silica and carbon-containing material and a liquid portion that contains impurities.

7. The method of producing a silica and carbon-containing material according to claim 1, further comprising, prior to the step (B):
  (A) an alkali dissolution step of mixing a silica-containing mineral with an aqueous alkali solution so as to prepare an alkaline slurry having a pH of at least 11.5, thereby dissolving, within the liquid portion, silicon (Si) from the silica-containing mineral to a silicon concentration in the liquid portion of at least 10 wt %, then solid-liquid separating the alkaline slurry so as to obtain an aqueous alkali silicate solution and a solid portion.

8. The method of producing a silica and carbon-containing material according to claim 7, further comprising, between the step (A) and the step (B):
  (B1) an impurity recovery step of mixing the aqueous alkali silicate solution obtained in the step (A) with an acid so as to prepare an alkaline slurry having a pH of more than 10.3 and less than 11.5 and a silicon (Si) concentration in the liquid portion of at least 10 wt %, thereby precipitating out impurities within the liquid portion, then solid-liquid separating the alkaline slurry so as to obtain an aqueous alkali silicate solution and a solid portion.

9. The method of producing a silica and carbon-containing material according to claim 7, further comprising, prior to the step (A):
  (A1) a starting material water rinsing step of rinsing the silica-containing mineral with water so as to remove clay and organic matter.

10. The method of producing a silica and carbon-containing material according to claim 7, further comprising, prior to the step (A):
  (A2) a starting material firing step of firing the silica-containing mineral at from 300 to 1000° C. for a period of from 0.5 to 2 hours so as to remove organic matter.

11. A method of producing silicon carbide, comprising:
  obtaining the silica and carbon-containing material by the method of producing a silica and carbon-containing material according to claim 1, and
  obtaining silicon carbide by firing the silica and carbon-containing material.

* * * * *